United States Patent
Pettit, Jr. et al.

[15] 3,684,942
[45] Aug. 15, 1972

[54] ARC WELDING CURRENT CONTROL APPARATUS

[72] Inventors: Lewis F. Pettit, Jr., Ellicott City; Thomas L. May, Sykesville, both of Md.

[73] Assignee: Westinghouse Electric Corporation, Pittsburgh, Pa.

[22] Filed: Jan. 5, 1971

[21] Appl. No.: 104,081

[52] U.S. Cl. ................321/5, 219/131 WR, 321/18, 321/25
[51] Int. Cl. ............................................H02m 7/00
[58] Field of Search ...219/131 WR, 135; 321/18, 25, 321/5

[56] References Cited
UNITED STATES PATENTS

| | | |
|---|---|---|
| 3,287,625 | 11/1966 | Malatier et al...........321/25 X |
| 3,237,051 | 2/1966 | Schober.................219/135 X |
| 3,358,210 | 12/1967 | Grossoehme............321/25 X |
| 3,299,340 | 1/1967 | Deelman.....................321/18 |

Primary Examiner—William M. Shoop, Jr,
Attorney—A. T. Stratton, C. L. Freedman and John L. Stoughton

[57] ABSTRACT

An arc welding apparatus in which the arc current is controlled by a saturable reactor having a control winding pulsatingly energized for intervals which vary in accordance with the temperature with the controlled winding and which intervals also vary in accordance with the potential which is supplied to the welding apparatus.

29 Claims, 4 Drawing Figures

INVENTOR
Lewis F. Pettit, Jr.
Thomas L. May

John L. Houghton
ATTORNEY

ARC WELDING CURRENT CONTROL APPARATUS

BRIEF SUMMARY OF THE INVENTION

This invention relates to apparatus for changing the charging rate of an energy storage element to thereby change the time interval during each half cycle of the alternating potential source that control current is supplied to the flux control winding of a current controlling reactor in the alternating potential welding power supply whereby changes in the current to the arc due to the changes in temperature of the reactor and in the magnitude of the potential supplied to the arc are minimized. In this specific embodiment, the correction for the change in temperature is accomplished by a negative temperature coefficient resistor located in heat exchange relation with the control winding. The correction for the change in potential is accomplished by a switching device which is maintained nonconducting when the magnitude of a first potential applied between a first terminal and a second terminal thereof is below the product of a constant and the total potential applied between the second terminal and a third terminal of the switching device and in which the switching device is maintained conducting when the magnitude of the first potential is substantially equal to or greater than the total potential. Such a switching device may take many specific forms such as for example a unijunction transistor, a programmable unijunction transistor, a silicon controlled switch, a silicon unilateral switch, a two transistor equivalent, etc.

BRIEF DESCRIPTION OF THE DRAWING

For a better understanding of the invention reference may be had to a preferred embodiment exemplary of the invention shown in the accompanying drawings in which.

DETAILED DESCRIPTION OF THE INVENTION

Figure 1:
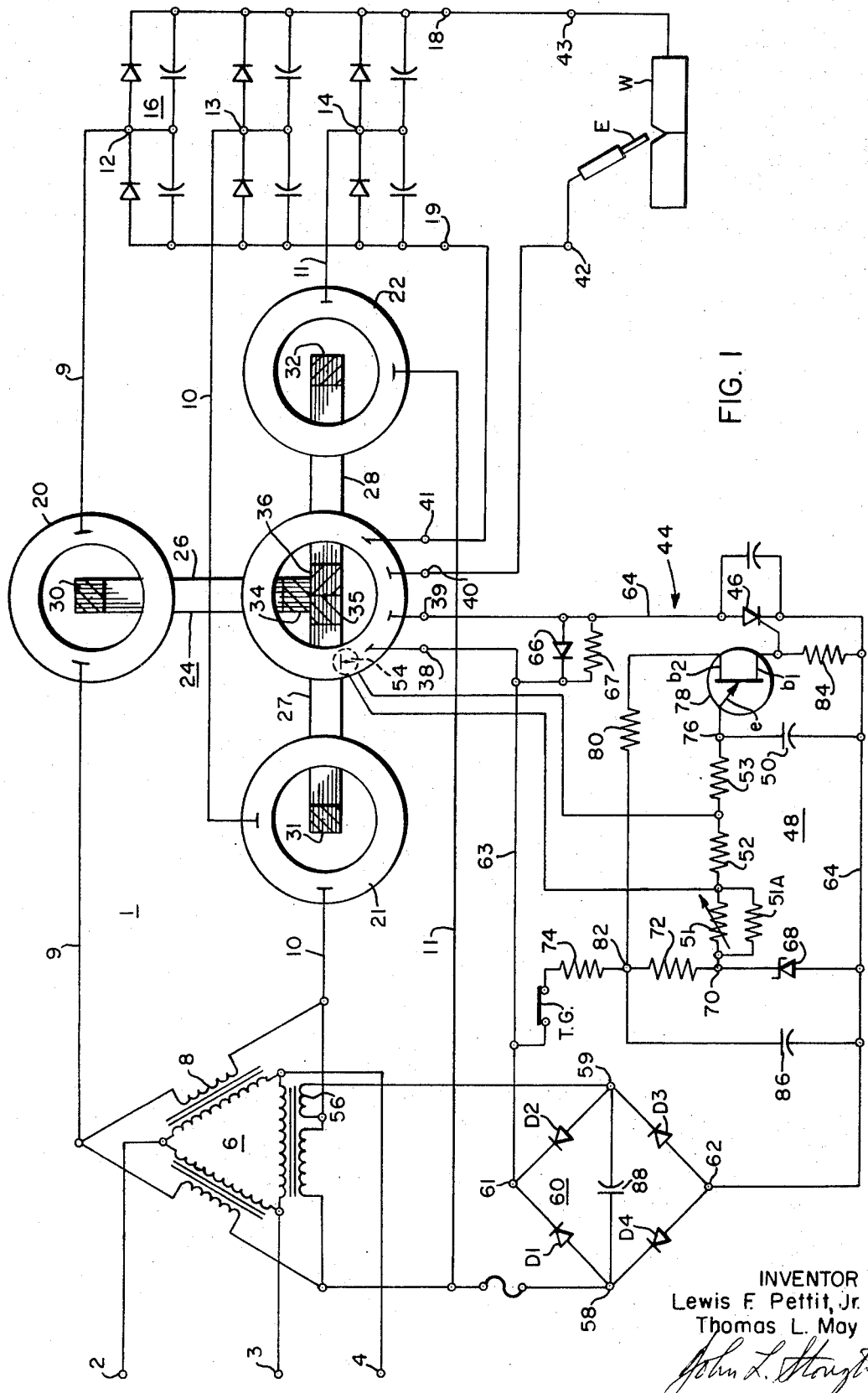
FIG. 1 illustrates a welding apparatus embodying the current controlling system of my invention.

Referring to the drawings by characters of reference the numeral 1 indicates generally a direct current welder energized from a plurality of power supplying terminals 2, 3 and 4 which may be energized from a three phase power supply (not shown) of any desirable potential such as 230 or 460 volts. A polyphase supply is illustrated, however, the invention is applicable with any number of phases including a single phase supply. The polyphase power transformer 6 has its primary windings connected to the power supply terminals 2, 3 and 4 in a suitable manner such as the delta connection illustrated. The power transformer 6 is provided with a delta connected secondary winding 8 which energizes polyphase busses 9, 10 and 11. These busses connect the secondary windings 8 to the polyphase alternating current input terminals 12, 13 and 14 of a polyphase rectifier 16 having direct current output terminals 18 and 19. Inserted in series in the busses 9, 10 and 11 are alternating current control windings 20, 21 and 22, respectively, of a polyphase saturating core type reactor 24. It will be apparent, however, that if desired these control windings could be connected in series with individual secondary phases of the delta.

The reactor 24 comprises three separate flux conducting closed iron paths 26, 27 and 28 having first legs 30, 31 and 32, respectively, and second legs 34, 35 and 36, respectively. The iron paths are arranged as illustrated with the second legs 34, 35 and 36 in close juxtaposed relation and with the first legs 30, 31 and 32 spaced outwardly from the juxtaposed second legs 34, 35 and 36. A pair of direct current flux control windings are coiled about the second legs 34, 35 and 36. A first of these windings has terminals 38 and 39 and the second of these windings has terminals 40 and 41.

The output terminal 19 of the rectifier 16 is connected to a load terminal 42 through the direct current flux control winding which has the terminals 40 and 41. The load terminal 42 is illustrated as being connected to a welding electrode E. The other direct current output terminal 18 of the rectifier 16 is connected to a load terminal 43 which load terminal is illustrated as being connected to the work W. The electrode E and work W are shown as being in the straight polarity connection. It will be appreciated by those skilled in the art that, if desired, a reverse polarity connection for a particular type of welding the same may be utilized.

The energization of the flux controlling winding having the terminals 38 and 39 is under control of a regulating network generally designated 44. This network 44 includes a switching means such as a thyristor 46 and an R/C controlling network 48 which includes an energy storage device 50 and a regulating means illustrated as being a capacitor and a plurality of resistors 51, 51A, 52 and 53 for controlling the rate of change in the energy stored in the device 50. One or more of the resistors 51, 52 and 53 may be variable. In the illustrated example, the resistor 51 is variable with a maximum resistance of 50 K ohms and the resistance of the shunt connected resistor 51A is 82 K ohms. It has been found that with this arrangement of resistors a substantial linear relationship is obtained between current at the electrode E and magnitude of the resistance to which resistor 51 may be adjusted.

A negative temperature coefficient resistor such as a thermistor 54 is connected in the R/C network 48 to vary the effective resistance thereof in accordance with its temperature. As illustrated the thermistor 54 is connected in shunt with resistor 52 and is physically cemented to one of the DC control windings as by means of a thermally conducting epoxy. It will be appreciated that the thermistor 54 may be located in other locations on the saturable reactor 24 or other means, sensitive to temperature of the saturable reactor 24, could be provided to actually vary the magnitude of the resistance of the R/C network 48. The illustrated arrangement is preferred because of its simplicity.

The power for energizing the R/C network 48 is derived from one phase of the power supplied to the terminals 2, 3 and 4. As illustrated, this power is derived through one of the secondary windings 8 connected in series with a tertiary winding 56 to provide a suitable potential for the regulating network 44. A suitable potential with the illustrated circuit parameters is 115 volts RMS. This control energizing potential is applied to the AC terminals 58 and 59 of a full wave rectifier 60 having DC output terminals 61 and 62. The positive DC output terminal 61 of the rectifier 60 is connected by bus 63 to the terminal 38. The negative potential DC terminal 62 is connected by a bus 64 to the other terminal 39 of the flux winding. The thyristor 46 is connected in series in the bus 64 to connect and disconnect the winding to and from the power source. During the periods that the thyristor 46 is not conducting current will circulate through the winding and a rectifier 66 and to some extent through the shunt connected resistor 67.

A regulated source of potential is provided for the R/C network 48 by suitable means such as the illustrated Zener diode 68 which preferably breaks over at 24 volts. This diode 68 has one terminal connected to the bus 64, to which one terminal of the capacitor 50 is connected, and its other terminal connected to the common connection 70 of the resistor 51 and a voltage dropping resistor 72. The resistor 72 (preferably 270 ohms) is connected through a second voltage dropping resistor 74 (preferably 6.8 K ohms) and a normally closed temperature sensitive switch T.G. to the bus 63. The common connection 76 of the resistor 53 and capacitor 50 is connected to the emitter e of a unijunction transistor 78 having its base $b_2$ connected through a resistor 80 to the common connection 82 of the resistors 72 and 74 and its base $b_1$ connected through a resistor 84 to the bus 64. If desired, a high frequency by-pass capacitor 86 may be connected between the bus 64 and the common connection 82 in shunt with the resistor 72 and Zener diode 68.

A capacitor 88 having a capacity of 5 mfd. or greater is connected across the alternating potential input terminals of the full wave rectifying network 60. Under some operating conditions the capacitor 88 may be omitted. It has been found experimentally, however, that when the capacitor 88 is omitted the thyristor 46 does not always turn off as desired. When the capacitor 88 is utilized, the thyristor 46 will always turn off each half cycle of the alternating potential applied to the regulating network 44. The theory as to why the capacitor 88 so aids in the turn off of the thyristor 46 is somewhat obscure. It is believed, however, that the capacitor 88 provides a time delay of current zero through the thyristor 46 to permit the thyristor 46 to regain control whereby forward potential thereacross will not cause the thyristor 46 to reconduct prior to the application of a gate signal thereto.

Figure 2:
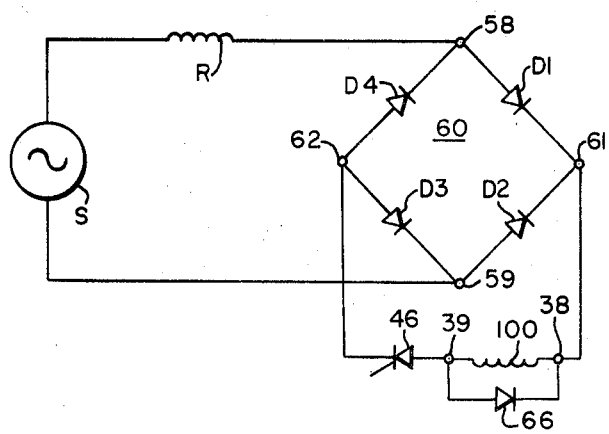
FIG. 2 is a schematic circuit useful in understanding the invention.

It is believed that this failure of the thyristor 46 to interrupt the current flow therethrough each half cycle of the voltage of the source potential S may best be explained by reference to FIGS. 2-4 and is due to the presence of reactance in the source connected to the AC input terminals 58 and 59 of the full wave bridge 60. This reactance, at least in part, is probably the leakage reactance of the transformer 6. The reactance is illustrated in FIG. 2 by the lumped inductance of the inductor R. The bridge 60 includes the diodes D1-D4, each having threshold drops, and the DC circuit connected to the bridge 60 includes the coil 100 (having the terminals 38 and 39), thyristor 46 having (a forward threshold drop), and a diode 66 shunt connected across the coil 100 to limit the voltage which can be induced by the collapsing flux of the highly reactive coil 100.

Figure 3:
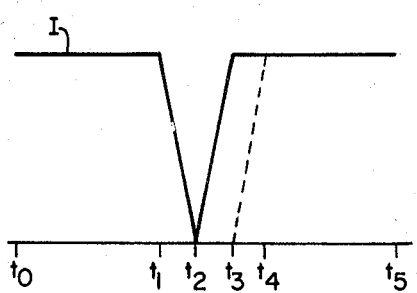
FIGS. 3 and 4 are curves useful in understanding the invention.

For purposes of explanation it will be assumed that the current through the coil 100 is substantially constant and is of the magnitude represented by the heighth of line I of FIG. 3 between the time intervals $t_0$-$t_1$ and $t_3$-$t_5$. The curve E of FIG. 4 represents the voltage applied to the AC input terminals 58-59 and is the sum of the voltages generated by the source S and the inductor R.

During the time interval $t_0$-$t_1$ the voltage E is greater than the sum of the voltage drops across the diodes D1 and D3 plus the drop across the thyristor 46 with the excess appearing across the coil 100; the diode 66 is prevented from conducting by its polarization. At the time $t_1$ the current I through the thyristor 46 will commence to decrease below the substantially constant magnitude of the current through the coil 100; the excess coil current flowing through the diode 66. At this time $t_1$, the potential generated by the collapsing flux in the coil is equal to that of one of the conducting diodes D of the bridge (assuming the diodes D and 66 are alike). The voltage necessary for current flow I is equal to the sum of the threshold drop across one of the diodes D and across the thyristor 46. This voltage sum is represented by the portion of the curve E between the times $t_1$ and $t_2$. As is indicated by curve I the current flow through the source S and reactor R during this time period decreases and the inductor R adds a voltage to the decreasing voltage of the source S.

At the time $t_2$ the current I through R reaches a zero magnitude. Therefore at the time $t_2$ the voltage E suddenly and abruptly reverses to a magnitude indicated by the curve E and the current I abruptly reverses as indicated by the curve I. The magnitude of the abrupt change in the voltage E in the reverse polarity will to a great extent be determined by the magnitude of the circuit reactance. The greater the magnitude of this reactance the longer the interval $t_1$-$t_2$ and vice versa. The rate of change in the potential of the source S is constant, as determined by the Hz of the source, and therefore time period $t_1$-$t_2$ will increase with an increase in the circuit reactance.

Figure 4:
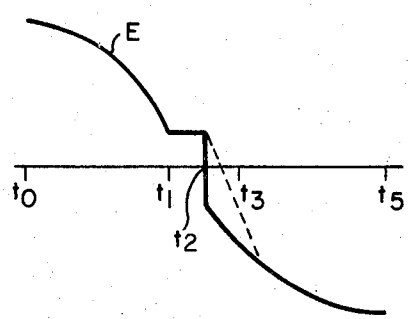

The presence of the capacitor 88 (preferably 5 mfd. or larger) decreases the abruptness of the change in the voltage E as indicated by the dotted line in FIG. 4 and maintains the current I at a zero magnitude between the times $t_2$ and $t_3$ after which it increases during the time $t_3$-$t_4$ to the magnitude I as shown by the dotted line in FIG. 3. During the time period $t_2$-$t_3$ (with the capacitor 88 utilized), the voltage established across the diode 66 is less than the forward drops through a diode D and the thyristor 46 and is insufficient to cause current to flow through the thyristor 46 and the parallelly connected pairs of diodes D1-D4 and D2-D3. A portion of the time interval $t_2$-$t_3$ provides the time required for the thyristor 46 to reestablish itself such that it will block forward conduction when the potential is reapplied. The magnitude of the delay in potential reversal at the terminals 58 and 59 is determined primarily by the magnitude of the capacitance of the capacitor which requires an increase in the time interval to reverse in polarity with an increase in the magnitude of its capacitance.

The foregoing theory which is believed to be correct was developed to explain applicants' observation that some thyristors did not always turn off when they were supposed to and some other thyristors could not be used at all since they were unable to turn off the current flow therethrough. When the capacitor 88 was added it was found that all of the thyristors including the transistors which did not work at all without the capacitor were effective to control the energization of the coil 100 as desired.

It is believed that the remainder of the description may be best understood from a description of operation which is as follows: suitable potential is supplied from a three phase source to the power supply terminals 2, 3 and 4. A potential of a suitable magnitude is supplied by the transformer 6 to the alternating current input terminals 12, 13 and 14 of the polyphase rectifier 16 and the alternating current controlling windings 20, 21 and 22. Rectified current is supplied by the rectifier output terminals 18 and 19 to the electrode E and the work W through the load terminals 42 and 43. The current flow through the control winding which has the input terminals 40 and 41 is polarized to increase the magnitude of saturating flux in the reactor 24 as a function of the increase in current flow to the welding electrode E.

The magnitude of the saturating current applied to the saturating winding which has the terminals 38 and 39 is under control of the thyristor 46 which is fired each half cycle of the supplied potential at a time interval as determined by the firing of the unijunction transistor 78. Immediately after voltage zero, at the output terminals 61 and 62, current will flow through the resistors 74 and 72 to the R/C network 48 and the capacitor 50 charges at a rate determined primarily by the magnitude of the resistors 51, 51A, 52, 53 and 54. The magnitude of this charging voltage is maintained substantially constant by the Zener diode 68 to 24 volts. When the capacitor 50 reaches its critical charge it will have raised the potential of the emitter e sufficiently with respect to the base $b_2$ whereby the unijunction transistor 78 will conduct and the capacitor 50 will discharge through the resistor 84. The resulting potential developed across the resistor 84 provides a gate signal to the thyristor 46 which thereupon conducts to energize the terminals 38 and 39. As discussed above in connection with FIGS. 2, 3 and 4 the current flow through the thyristor 46 will terminate each half cycle of the potential supplied to the rectifier 60. The capacitor 50 substantially completely discharges each half cycle and will provide a substantially constant delay for any given value of the magnitude of the total impedance of the resistors 51, 52, 53 and 54 when the potential supplied to the busses 63 and 64 is of a fixed value.

Since the saturable reactor device 24 is subject to changes in load impedance because of the self-heating of its windings, the time of firing of the thyristor 46 and the consequent energization of the current therethrough the flux controlling winding should be altered as a function of the temperature of the reactor 24. The thermistor 54 has a negative resistance coefficient and is connected in shunt with the resistor 52 whereby the impedance of the charging circuit of the capacitor 50 is decreased in accordance with an increase in temperature in the reactor. This results in a more rapid charging of the capacitor 50 to the critical potential and the thyristor 46 will be fired sooner. A proper relationship of the resistance of the thyristor 54 and of the resistor 52 will substantially reduce if not completely eliminate the change in output current to the electrodes caused by the heating of the saturable reactor 24.

Similarly an increase in potential at the input terminals 2, 3 and 4 will tend to increase the current output to the electrode E and this is compensated for, at least in part, by arranging the base electrodes of the unijunction transistor in shunt not only with the potential as set up by the Zener diode 68 but also in shunt with the resistor 72 whereby an increase in potential at the terminals 2, 3 and 4 results in an increase potential between the base electrode $b_1$ and $b_2$ of unijunction 78 and a constant increase in the potential to which the capacitor 50 must be raised before the unijunction transistor 78 will conduct. With this arrangement additional time is required to fire the thyristor 46 with an increase in input potential. This delay increases the reactance of the saturable reactor 24 and prevents an increase in the current supplied to the welding electrode E.

It will therefore be apparent that there has been disclosed a welding apparatus for maintaining the electrode current substantially constant irrespective of changes in the supply voltage and irrespective of changes in temperature of the current controlling reactor.

What is claimed and is desired to be secured by United States Letters Patent is as follows:

1. A power regulating network comprising a load including an energizable winding, first input connections adapted to be energized from a source of electrical energy, an energy storage element, regulating means, a first network connecting said storage element to said input connections, said first network including said regulating means whereby rate of change in the energy stored in said storage element may be regulated, second input connections adapted to be energized from a source of electrical energy, a second network energized from said second input connections and including said energizable winding and a circuit controlling means for controlling the energy supplied to said energizable winding, means connecting said circuit controlling means to said first network for actuation of said circuit controlling means as a function of the magnitude of the energy stored in said storage element, said regulating means having a portion thereof responsive to an operating condition of said load when said load is in an energized condition, said portion being effective to alter said regulating means as a function of the magnitude of said operating condition and thereby change the magnitude of the energy supplied to said energizable winding.

2. The combination of claim 1 in which said operating condition is the potential across said energizable winding.

3. The combination of claim 1 in which said operating condition is temperature.

4. The combination of claim 3 in which said regulating means includes impedance means and said portion of said regulating means alters the magnitude of the impedance of said impedance means.

5. The combination of claim 4 in which said impedance of said regulating means decreases in magnitude with an increase in temperature of said load.

6. The combination of claim 1 in which said load comprises a saturable reactor having an alternating potential winding and a unidirectional potential control winding, said energizable winding being said unidirectional potential control winding, a second pair of input terminals adapted to be energized from a source of alternating potential power, a pair of output terminals, and third circuit means connecting said second pair of input terminals to said pair of output terminals and including said alternating potential winding of said reactor.

7. The combination of claim 6 in which said first input connections are energized with a series of pulses of electrical energy and said alteration of said regulating means acts to alter the instant in each said pulse of said series that said circuit controlling means is effective to initiate the flow of energy to said energizable winding.

8. The combination of claim 7 in which said operating condition is temperature and in which said portion of said regulating means is a negative temperature characteristic impedance device whereby the time interval between the start of each said pulse and the time said initiating is decreased with increase in temperature of said load.

9. The combination of claim 7 in which said operating characteristic is the potential across said energizing winding and in which said portion of said regulating means increases the time interval between the start of each said pulse and the time of said initiation in response to an increase in the RMS potential across said energizing winding.

10. The combination of claim 8 in which said regulating means comprises a voltage limiting element and a pair of impedance elements connected in series with each other, said storage element and said regulating means being connected in shunt with said voltage limiting element.

11. The combination of claim 10 in which said means which connects said circuit controlling means to said first network includes a unijunction transistor type device having a pair of base electrodes and an emitter, said base electrodes being connected to be energized by the potential appearing across said voltage limiting element and one of said pair of said impedance elements.

12. In a welding apparatus, a plurality of main input terminals adapted to be energized from a source of polyphase electrical energy, a polyphase transformer having primary and secondary windings, a polyphase current controlling reactor having a plurality of current conducting windings, a polyphase rectifier having polyphase input terminals and unidirectional power supplying terminals, circuit means connecting said primary windings to said main input terminals and connecting said secondary windings through a first plurality of said current windings to said polyphase input terminals of said rectifying network, a current regulating network having a pair of input terminals and a pair of output terminals and a rectifying network, said rectifying network having alternating potential input terminals connected for energizations from said main input terminals and having unidirectional potential terminals, said regulating network further including a switching means and an R/C controlled network having a resistor series connecting with a capacitor, circuit means connecting said unidirectional terminals to a designated winding of said current windings through said switching means, said R/C network being connected to said unidirectional terminals for energizations of its said capacitor thereby, said network including a voltage responsive switch having an output circuit and a control circuit, said control circuit being connected to said R/C network whereby its potential is changed as a consequence of a change in potential, said capacitor to render its associated output circuit conductive, said switching means being connected to said output circuit of said voltage responsive switch whereby said switching means is rendered effective to energize said designated winding of said windings of said reactor as a consequence of the conduction of said voltage responsive switch, and means including said switching means for terminating the energization of said unidirectional winding means of said reactor, and means thermally associated with said reactor and said R/C network and effective to decrease the R/C time constant of said R/C network with an increase in temperature of said reactor whereby to compensate for increase in the impedance in at least one of said reactor windings.

13. The combination of claim 12 in which said reactor includes a plurality of separate flux conducting iron paths, each said iron path having first and second legs, said first plurality of said windings of said reactor being alternating current conducting windings and being individually wound about said first legs, said designated winding being a unidirectional current conducting winding for supplying control flux to said iron paths and being wound about all of said second legs and said one reactor winding being said unidirectional current conducting winding.

14. The combination of claim 12 in which said regulating network includes a first and a second voltage dropping element and a voltage limiting element connected in series and in the order named between said unidirectional potential terminals, said series connected resistor and capacitor being connected in parallel with said voltage limiting element, said voltage responsive switch being a unijunction type switch having three terminals, a first pair of said three terminals defining at least in part its said control circuit and a second pair of said three terminals defining at least in part its said output circuit, said second pair of said three terminals being connected in shunt with said capacitor, and said first pair of said three terminals being connected in shunt with said voltage limiting element and at least said second voltage dropping element.

15. The combination of claim 14 in which there is provided a pair of load terminals, said reactor includes a plurality of separate flux conducting iron paths, each said iron path having first and second legs, said first plurality of said windings of said reactor being alternating current conducting windings and being individually wound about said first legs, said designated winding being a unidirectional current conducting winding for supplying a control flux to said iron paths and being wound about all of said second legs, said one reactor winding being a unidirectional current winding for supplying control flux to said iron paths and being wound about all of said second legs, said one reactor winding being said unidirectional current winding, said winding having a second unidirectional current winding wound about all of said second legs, and means connecting said second unidirectional winding between one of said unidirectional power supplying terminals of said polyphase rectifier and one of said load terminals, the other of said load terminals being connected to the other of said unidirectional power supplying terminals of said polyphase rectifier.

16. An energizing network for an inductive load comprising a pair of input terminals adapted to be energized from a source of alternating potential, a first rectifier having alternating potential terminals and unidirectional potential terminals, means connecting said alternating potential terminals to said input terminals, a pair of output terminals adapted to be connected to an inductive load, a discontinuous control type switch having a control circuit and a main circuit, said control circuit being effective to initiate conduction of said main circuit and ineffective to terminate conduction of said main circuit, means connecting said output terminals to said unidirectional terminals and including said main circuit, and control means operatively connected to said input terminals for energization by power derived from said input terminals, said control means including timing means effective to energize said control means for rendering said main circuit conducting, and an energy storage device connected between said alternating potential terminals.

17. The combination of claim 16 in which an asymmetrical current controlling device is connected between said output terminals, said asymmetric device when conducting reactive derived current having a lesser potential dropped thereacross than the potential dropped across a circuit which extends between said output terminals through said main circuit and said rectifier.

18. The combination of claim 17 in which said switch is a semiconductor device having a P-N junction in its main circuit and in which said rectifier is a full wave network and includes a regenerative current circuit connected to conduct current between said unidirectional terminals in shunt with said alternating potential terminals, said regenerative current circuit including at least one semiconductor diode rectifier, and in which the threshold drops of said main circuit and of said regenerative current circuit is greater than the potential drop across said asymmetric device.

19. The combination of claim 18 in which said rectifier is a full wave rectifier, said regenerative circuit has two legs and each said leg including a pair of series connected semiconductor diodes, and said asymmetric device is a semiconductor diode rectifier poled to conduct current in the same direction between said output terminals as said regenerative circuit.

20. The combination of claim 19 in which there is provided a power transformer having primary and secondary winding means, a full wave power rectifier, a saturable core reactor having alternating current winding means and a direct current control winding means, an input circuit for said primary winding means adapted to be energized with alternating potential, a power circuit connected between said secondary winding means and said power rectifier and including said alternating current winding means, means operatively connecting said input terminals to said input circuit for energization of said first rectifier with single phase alternating potential energy, and means connecting said control winding means to said output terminals.

21. The combination of claim 20 in which said control means includes a unijunction type semiconductor device having a plurality of terminals, means connecting a first pair of said plurality of terminals of said unijunction type device to said unidirectional potential terminals of said first rectifier, said timing means including a resistance means series connected with a timing capacitor, a second pair of said plurality of terminals of said unijunction type device being connected across said timing capacitor, and means connecting said second pair of said terminals of said unijunction type device to said control circuit of said switch.

22. The combination of claim 21 in which said control means includes a voltage dropping means and a voltage limiting element connected in series between said unidirectional terminals of said first rectifier, said series connected resistance means and timing capacitor being connected in shunt with said voltage limiting element and said first pair of terminals of said unijunction type device being connected across a circuit comprising a portion of said voltage dropping means series connected with said voltage limiting means.

23. The combination of claim 22 in which said control means includes a temperature sensing means arranged in heat exchange condition with at least one of said windings of said reactor and effective to decrease the time required to change said timing capacitor and the consequent actuation of said switch by said unijunction type device whereby to compensate for the temperature change in said reactor.

24. A power regulating network comprising a load including an energizable winding, first input connections adapted to be energized from a source of electrical energy, a phase shifting circuit, a first network connecting said storage element to said input connections, said first network including said phase shifting circuit, second input connections adapted to be energized from a source of electrical energy, a second network energized from said second input connections and including said energizable winding and a circuit controlling means for controlling the energy supplied to said energizable winding, means connecting said circuit controlling means to said first network for actuation of said circuit controlling means as a function of the delay afforded by said phase shifting circuit, said phase shifting circuit having a portion thereby responsive to an operating condition of said load when said load is in an energized condition, said portion being effective to alter the delay provided by said phase shifting circuit as a function of the magnitude of said operating condition.

25. The combination of claim 24 in which said operating condition is the potential across said energizable winding.

26. The combination of claim 24 in which said operating condition is temperature.

27. The combination of claim 24 in which said load comprises a saturable reactor having an alternating potential winding and a unidirectional potential control winding, said energizable winding being said unidirectional potential control winding, a second pair of input terminals adapted to be energized from a source of alternating potential power, a pair of output terminals, and third circuit means connecting said second pair of input terminals to said pair of output terminals and including said alternating potential winding of said reactor.

28. The combination of claim 27 in which said first input connections are energized with a series of pulses of electrical energy and said alteration of said phase shifting circuit acts to alter the instant in each said pulse of said series that said circuit controlling means is effective to initiate the flow of energy to said energizable winding.

29. The combination of claim 28 in which said operating condition is temperature and in which said portion of said regulating means is a negative temperature characteristic impedance device whereby the time interval between the start of each said pulse and the time of said initiating is decreased with increase in temperature of said load.

* * * * *